(12) United States Patent
Tang

(10) Patent No.: US 9,174,154 B1
(45) Date of Patent: Nov. 3, 2015

(54) REUSABLE RETAINER ASSEMBLY

(71) Applicant: Tony W. Tang, Phoenix, AZ (US)

(72) Inventor: Tony W. Tang, Phoenix, AZ (US)

( * ) Notice: Subject to any disclaimer, the term of this patent is extended or adjusted under 35 U.S.C. 154(b) by 140 days.

(21) Appl. No.: 13/974,296

(22) Filed: Aug. 23, 2013

(51) Int. Cl.
*B01D 46/00* (2006.01)
(52) U.S. Cl.
CPC ................................. *B01D 46/0002* (2013.01)
(58) Field of Classification Search
CPC ........ B01D 46/02; B01D 46/05; B01D 46/06; B01D 46/10; B01D 46/13; B01D 46/97; B01D 46/4236; B01D 2265/02; B01D 2265/28
USPC ........... 55/490, 496–497, 502, 507–508, 511, 55/517, DIG. 31, DIG. 35; 454/290
See application file for complete search history.

(56) References Cited

U.S. PATENT DOCUMENTS

| 3,150,945 | A | 9/1964 | Baggeson |
| 3,823,533 | A | 7/1974 | Alverson et al. |
| 4,439,219 | A | 3/1984 | Lambrecht |
| D275,174 | S | 8/1984 | Rolli |
| D276,619 | S | 12/1984 | Wilson |
| D283,872 | S | 5/1986 | Clendinen |
| 5,273,563 | A | 12/1993 | Pasch et al. |
| 2004/0154273 | A1 | 8/2004 | Stephan |
| 2005/0022489 | A1* | 2/2005 | Harden .......................... 55/481 |

* cited by examiner

*Primary Examiner* — Jason M Greene
*Assistant Examiner* — Karla Hawkins

(57) ABSTRACT

A reusable retainer assembly for retaining a filter in an air handler includes a clip that may couple a filter to an air handler. An engaging portion of the clip may engage the air handler so the clip is retained on the air handler. A retaining portion of the clip may engage the filter so the clip retains the filter on the air handler.

16 Claims, 4 Drawing Sheets

REUSABLE RETAINER ASSEMBLY

BACKGROUND OF THE DISCLOSURE

Field of the Disclosure

The disclosure relates to reusable retainer devices and more particularly pertains to a new reusable retainer device for retaining a filter in an air handler.

SUMMARY OF THE DISCLOSURE

An embodiment of the disclosure meets the needs presented above by generally comprising a clip that may couple a filter to an air handler. An engaging portion of the clip may engage the air handler so the clip is retained on the air handler. A retaining portion of the clip may engage the filter so the clip retains the filter on the air handler.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
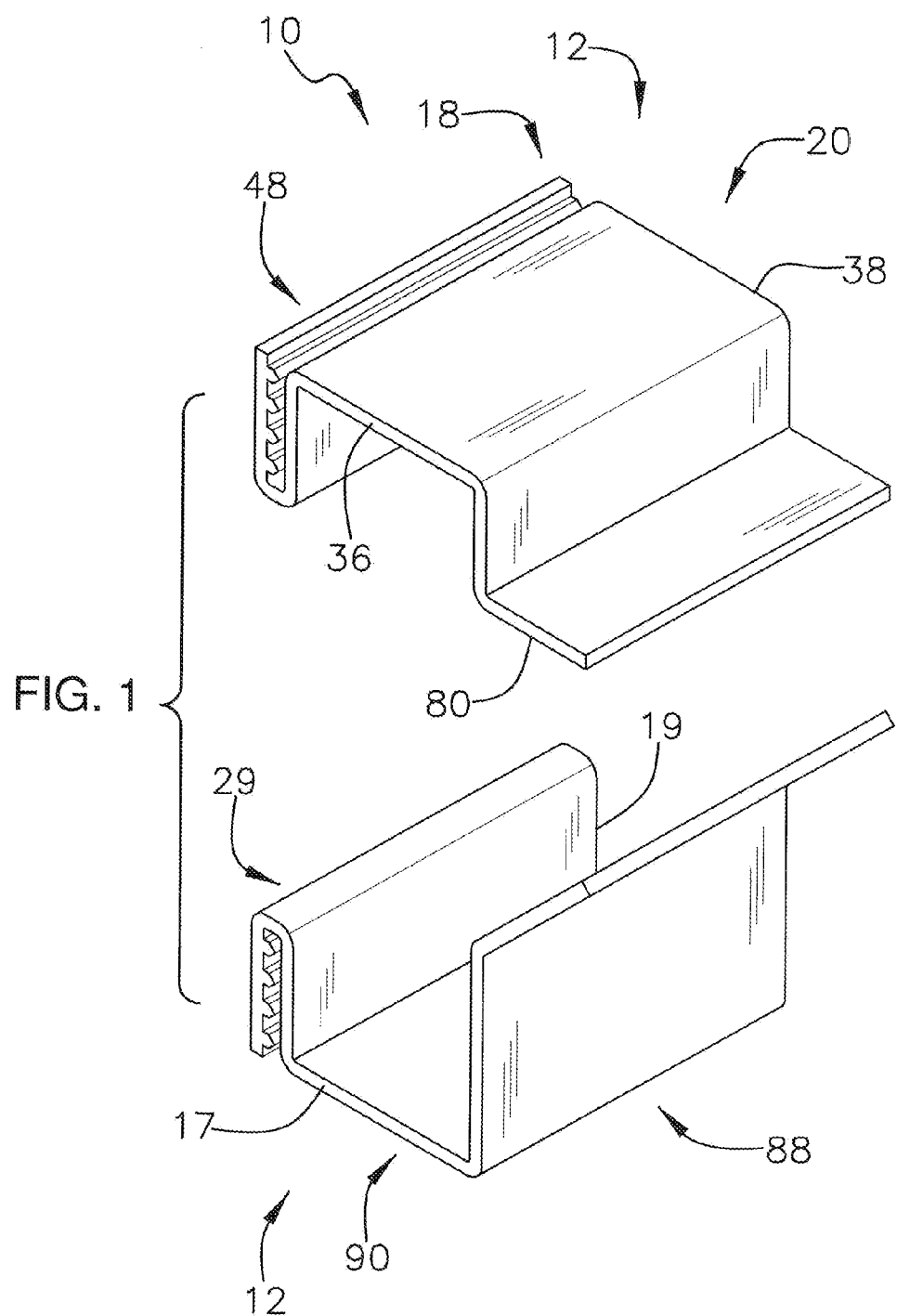
FIG. 1 is a front perspective view of a reusable retainer assembly according to an embodiment of the disclosure.
Figure 2:
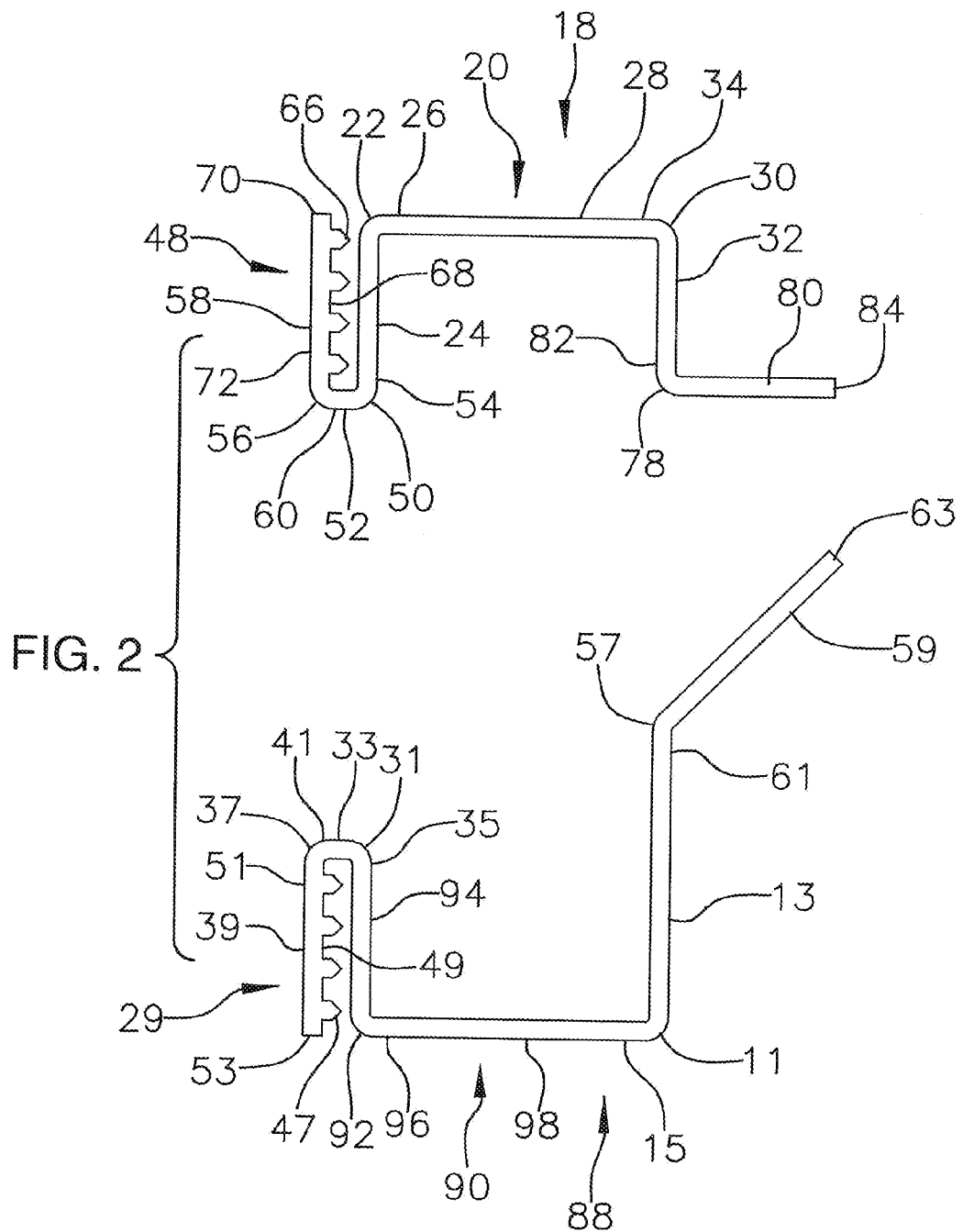
FIG. 2 is a right side view of an embodiment of the disclosure.
Figure 3:
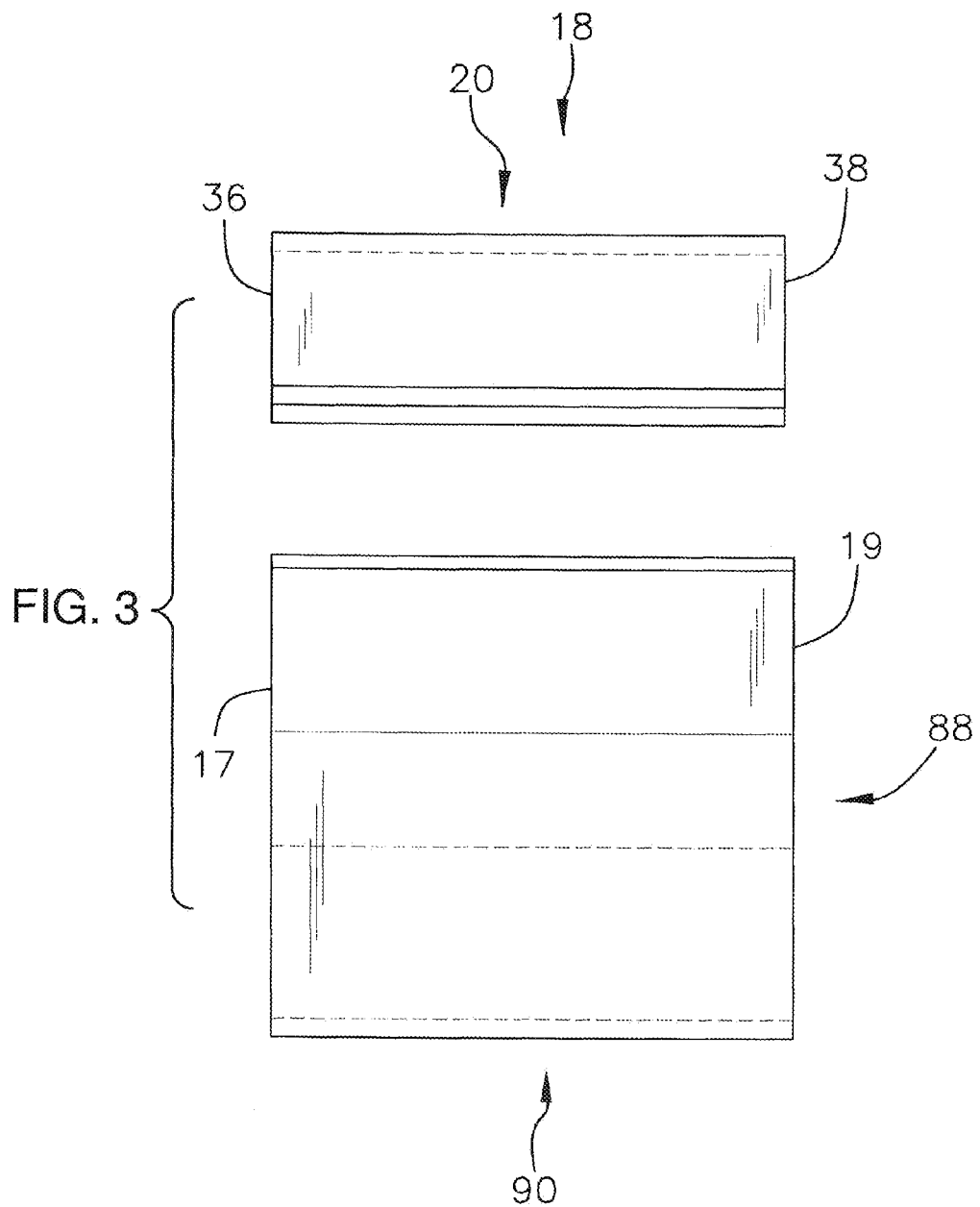
FIG. 3 is a front view of an embodiment of the disclosure.
Figure 4:
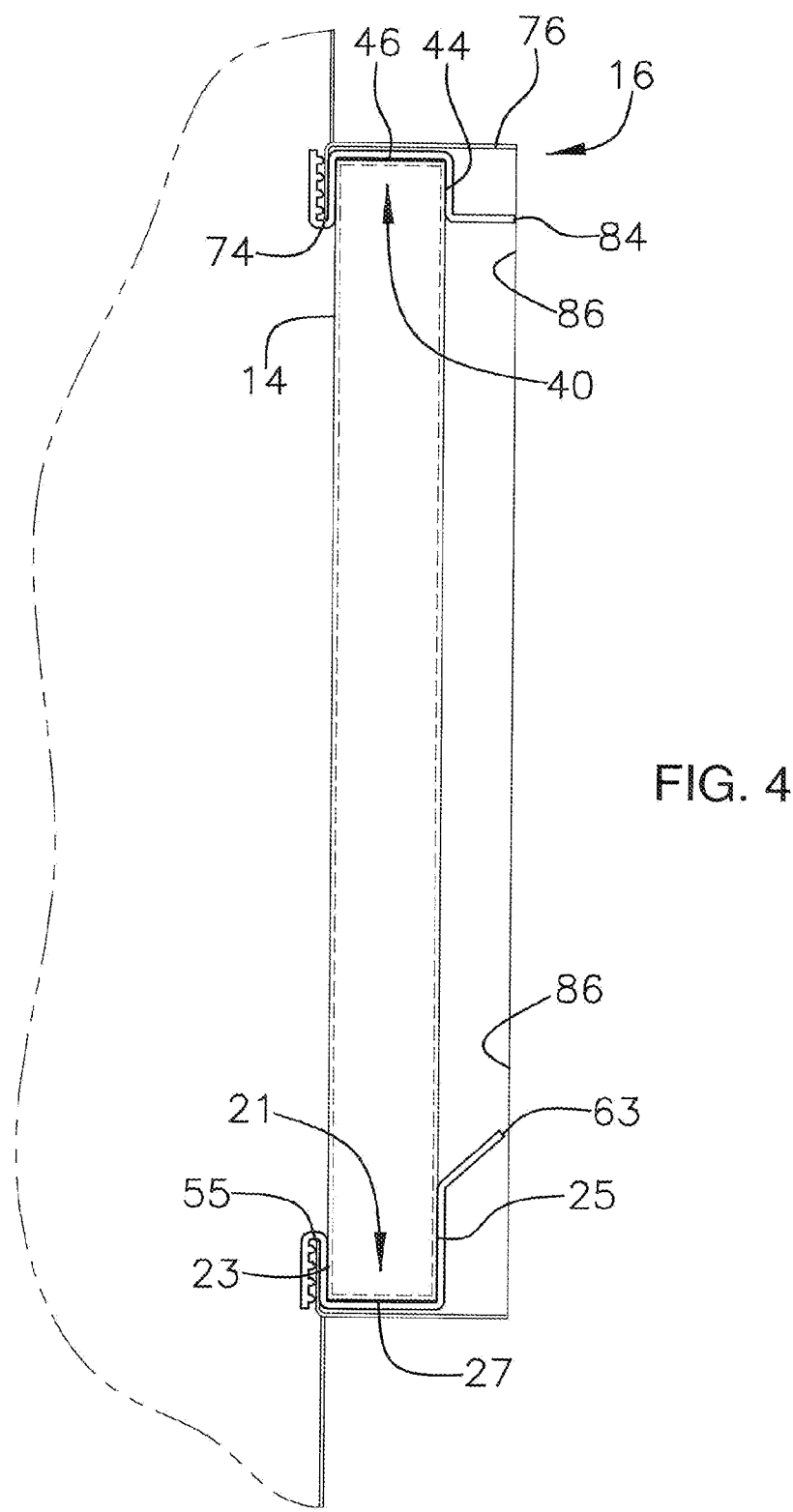
FIG. 4 is an in-use view of an embodiment of the disclosure.

With reference now to the drawings, and in particular to FIGS. 1 through 4 thereof, a new reusable retainer device embodying the principles and concepts of an embodiment of the disclosure and generally designated by the reference numeral 10 will be described.

As best illustrated in FIGS. 1 through 4, the reusable retainer assembly 10 generally comprises a clip 12 that may couple a filter 14 to an air handler 16. The filter 14 may be a particulate air filter of any conventional design. Moreover, the air handler 16 may be an air conditioner of any conventional design or a furnace of any conventional design. The clip 12 may have a width between 2 cm and 5 cm. The clip 12 is one of a pair of the clips.

A top one of the pair of clips 18 comprises an engaging portion 20 of the top clip 18. A first bend 22 defines a first vertical arm 24 of the engaging portion 20 of the top clip 18 extending downwardly from a first end 26 of a horizontal arm 28 of the engaging portion 20 of the top clip 18. Further, a second bend 30 defines a second vertical arm 32 of the engaging portion 20 of the top clip 18 extending downwardly from a second end 34 of the horizontal arm 28 of the engaging portion 20 of the top clip 18. Moreover, the engaging portion 20 of the top clip 18 has a U-shaped cross section taken along a longitudinal axis extending between a first lateral edge 36 and a second lateral edge 38 of the top clip 18. The first 24 and second 32 vertical arms of the engaging portion 20 of the top clip 18 may be spaced apart a distance between 2 cm and 3 cm. Lastly, each of the first 24 and second 32 vertical arms of the engaging portion 20 of the top clip 18 may have a length between 1 cm and 2 cm.

The engaging portion 20 of the top clip 18 insertably receives a top portion 40 of the filter 14. Each of the first 24 and second 32 vertical arms of the engaging portion 20 of the top clip 18 abuts an associated one of a back side 42 and a front side 44 of the top portion 40 of the filter 14. The horizontal arm 28 of the engaging portion 20 of the top clip 18 abuts a top side 46 of the top portion 40 of the filter 14. Moreover, the engaging portion 20 of the top clip 18 frictionally engages the filter 14 so the filter 14 is retained in the engaging portion 20 of the top clip 18.

A retaining portion 48 of the top clip 18 comprises a third bend 50 defining a horizontal arm 52 of the retaining portion 48 of the top clip 18 extending laterally away from a bottom end 54 of the first vertical arm 24 of the engaging portion 20 of the top clip 18. A fourth bend 56 defines a vertical arm 58 of the retaining portion 48 of the top clip 18 extending upwardly from a second end 60 of the horizontal arm 52 of the retaining portion 48 of the top clip 18. Moreover, the retaining portion 48 of the top clip 18 has a J-shaped cross section taken along a longitudinal axis extending through a first lateral edge 62 and a second lateral edge 64 of the top clip 18. The retaining portion 48 of the top clip 18 may have a length between 1 cm and 2 cm.

A tooth 66 is coupled to and extends laterally away from an inside surface 68 of the vertical arm 58 of the retaining portion 48 of the top clip 18. Further, the tooth 66 extends between the first 62 and second 64 lateral edges of the top clip 18. The tooth 66 is one of a plurality of teeth 66 evenly distributed between a top end 70 and a bottom end 72 of the vertical arm 58 of the retaining portion 48 of the top clip 18. Continuing, the retaining portion 48 of the top clip 18 insertably receives a top edge 74 of a filter track 76 in the air handler 16. The plurality of teeth 66 frictionally engage the filter track 76 so the top clip 18 is retained in the air handler 16. A fifth bend 78 defines an external arm 80 extending laterally away from a bottom end 82 of the second vertical arm 32 of the engaging portion 20 of the top clip 18. Moreover, a free end 84 of the external arm 80 of the top clip 18 abuts a rear side 86 of the filter track 76 when the top clip 18 is coupled to the filter track 76.

A bottom one of the pair of clips 88 comprises an engaging portion 90 of the bottom clip 88. A first bend 92 defines a first vertical arm 94 of the engaging portion 90 of the bottom clip 88 extending upwardly from a first end 96 of a horizontal arm 98 of the engaging portion 90 of the bottom clip 88. The first vertical arm 94 of the engaging portion 90 of the bottom clip 88 may have a length between 1 cm and 2 cm. Continuing, a second bend 11 defines a second vertical arm 13 of the engaging portion 90 of the bottom clip 88 extending upwardly from a second end 15 of the horizontal arm 98 of the engaging portion 90 of the bottom clip 88. The second vertical arm 13 of the engaging portion 90 of the bottom clip 88 may have a height between 2 cm and 3 cm. Further, the engaging portion 90 of the bottom clip 88 has a U-shaped cross section taken along a longitudinal axis extending between a first lateral edge 17 and a second lateral edge 19 of the bottom clip 88.

Lastly, the first 94 and second 13 vertical arms of the engaging portion 90 of the bottom clip 88 may be spaced apart a distance between 2 cm and 3 cm.

The engaging portion 90 of the bottom clip 88 insertably receives a bottom portion 21 of the filter 14. Each of the first 94 and second 13 vertical arms of the engaging portion 90 of the bottom clip 88 abuts an associated one of a back side 23 and a front side 25 of the bottom portion 21 of the filter 14. The horizontal arm 98 of the engaging portion 90 of the bottom clip 88 abuts a bottom side 27 of the bottom portion 21 of the filter 14. Lastly, the engaging portion 90 of the bottom clip 88 frictionally engages the filter 14 so the filter 14 is retained in the engaging portion 90 of the bottom clip 88.

A retaining portion 29 of the bottom clip 88 comprises a third bend 31 defining a horizontal arm 33 of the retaining portion 29 of the bottom clip 88 extending laterally away from a top end 35 of the first vertical arm 94 of the engaging portion 90 of the bottom clip 88. A fourth bend 37 defines a vertical arm 39 of the retaining portion 29 of the bottom clip 88 extending downwardly from a second end 41 of the horizontal arm 98 of the retaining portion 29 of the bottom clip 88. Continuing, the retaining portion 29 of the bottom clip 88 has a J-shaped cross section taken along a longitudinal axis extending through a first lateral edge 43 and a second lateral edge 45 of the bottom clip 88. Lastly, the retaining portion 29 of the bottom clip 88 may have a length between 1 cm and 2 cm.

A tooth 47 is coupled to and extends laterally away from an inside surface 49 of the vertical arm 39 of the retaining portion 29 of the bottom clip 88. Further, the tooth 47 extends between the first 43 and second 45 lateral edges of the bottom clip 88. The tooth 47 is one of a plurality of teeth 47 evenly distributed between a top end 51 and a bottom end 53 of the vertical arm 39 of the retaining portion 29 of the bottom clip 88. Continuing, the retaining portion 29 of the bottom clip 88 insertably receives a bottom edge 55 of the filter track 76 in the air handler 16.

The plurality of teeth 47 frictionally engage the filter track 76 so the bottom clip 88 is retained in the air handler 16. A fifth bend 57 defines an external arm 59 extending away from a top end 61 of the second vertical arm 13 of the engaging portion 90 of the bottom clip 88. Further, the external arm 59 on the bottom clip 88 angles upwardly from the second vertical arm 13 of the engaging portion 90 of the bottom clip 88. A free end 63 of the external arm 59 of the bottom clip 88 abuts the rear side 86 of the filter track 76 when the bottom clip 88 is coupled to the filter track 76.

In use, each of the top 18 and bottom 88 clips are coupled to the filter 14. Continuing, the retaining portions 48, 88 of each of the top 18 and bottom 88 clips are coupled to the associated top 74 and bottom 55 edges of the filter track 76. The top 18 and bottom 88 clips secures the filter 14 in the filter track 76 so the filter 14 does not make noise from vibrating in the filter track 76. Lastly, the top 18 and bottom 88 clips additionally prevent dust from falling from the filter 14 due to unintended motion of the filter 14 in the filter track 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A reusable retainer assembly for retaining a filter in an air handler, said assembly comprising:
   a pair of clips, each said clip being configured to couple the filter to the air handler;
   a respective engaging portion of each said clip being configured to engage the air handler wherein said clip is retained on the air handler, each said engaging portion having a respective plurality of teeth extending laterally away from an inside surface of said retaining portion; and
   a respective retaining portion of each said clip being configured to engage the filter on opposing sides of the filter wherein said clips retain the filter on the air handler.

2. The assembly according to claim 1 further comprising a top one of said pair of said clips comprising:
   said engaging portion of said top clip comprising a first vertical arm of said engaging portion of said top clip coupled to and extending downwardly from a first end of a horizontal arm of said engaging portion of said top clip; and
   said engaging portion of said top clip comprising a second vertical arm of said engaging portion of said top clip coupled to and extending downwardly from a second end of a horizontal arm of said engaging portion of said top clip.

3. The assembly according to claim 2 further comprising wherein said engaging portion of said top clip has a U-shaped cross section taken along a longitudinal axis extending between a first lateral edge and a second lateral edge of said top clip.

4. The assembly according to claim 1 further comprising said engaging portion of a top one of said pair of clips insertably receiving a top portion of the filter wherein each of a first and a second vertical arm of said engaging portion of said top clip abuts an associated one of a back side and a front side of the top portion of the filter and a horizontal arm of said engaging portion of said top clip abuts a top side of the top portion of the filter wherein the filter is retained in said engaging portion of said top clip.

5. The assembly according to claim 1 further comprising:
   said retaining portion of a top one of said pair of clips comprising a horizontal arm of said retaining portion of said top one of said pair of clips coupled to and extending laterally away from a bottom end of a first vertical arm of said engaging portion of said top one of said pair of clips; and
   said retaining portion of said top one of said pair of clips comprising a vertical arm of said retaining portion of said top one of said pair of clips coupled to and extending upwardly from a second end of a horizontal arm of said retaining portion of said top one of said pair of clips.

6. The assembly according to claim 5 further comprising wherein said retaining portion of said top one of said pair of clips has a J-shaped cross section taken along a longitudinal axis extending through a first lateral edge and a second lateral edge of said top one of said pair of clips.

7. The assembly according to claim 1 further comprising said retaining portion of a top one of said pair of clips insertably receiving a top edge of a filter track in the air handler wherein said top one of said pair of clips is retained in the air handler.

8. The assembly according to claim 1 further comprising an external arm coupled to and extending laterally away from a bottom end of a second vertical arm of said engaging portion of a top one of said pair of clips.

9. The assembly according to claim 1 further comprising a bottom one of said pair of said clips comprising:
   said engaging portion of said bottom one of said pair of clips comprising a first vertical arm of said engaging portion of said bottom one of said pair of clips coupled to and extending upwardly from a first end of a horizontal arm of said engaging portion of said bottom one of said pair of clips; and
   said engaging portion of said bottom one of said pair of clips comprising a second vertical arm of said engaging portion of said bottom one of said pair of clips coupled to and extending upwardly from a second end of a horizontal arm of said engaging portion of said bottom one of said pair of clips.

10. The assembly according to claim 9 further comprising wherein said engaging portion of said bottom one of said pair of clips has a U-shaped cross section taken along a longitudinal axis extending between a first lateral edge and a second lateral edge of said bottom one of said pair of clips.

11. The assembly according to claim 1 further comprising said engaging portion of a bottom one of said pair of clips insertably receiving a bottom portion of the filer wherein each of a first and a second vertical arm of said engaging portion of said bottom one of said pair of clips abuts an associated one of a back side and a front side of the bottom portion of the filter and a horizontal arm of said engaging portion of said bottom one of said pair of clips abuts a bottom side of the bottom portion of the filter wherein the filter is retained in said engaging portion of said bottom one of said pair of clips.

12. The assembly according to claim 1 further comprising:
   said retaining portion of a bottom one of said pair of clips comprising a horizontal arm of said retaining portion of said bottom one of said pair of clips coupled to and extending laterally away from a top end of a first vertical arm of said engaging portion of said bottom one of said pair of clips; and
   said retaining portion of said bottom one of said pair of clips comprising a vertical arm of said retaining portion of said bottom one of said pair of clips coupled to and extending downwardly from a second end of a horizontal arm of said retaining portion of said bottom one of said pair of clips.

13. The assembly according to claim 12 further comprising wherein said retaining portion of said bottom one of said pair of clips has a J-shaped cross section taken along a longitudinal axis extending through a first lateral edge and a second lateral edge of said bottom one of said pair of clips.

14. The assembly according to claim 1 further comprising said retaining portion of a bottom one of said pair of clips insertably receiving a bottom edge of a filter track in the air handler wherein said bottom one of said pair of clips is retained in the air handler.

15. The assembly according to claim 1 further comprising an external arm coupled to and extending away from a top end of a second vertical arm of said engaging portion of a bottom one of said pair of clips.

16. A reusable retainer assembly for retaining a filter in an air handler, said assembly comprising:
   of a pair of clips;
   a top one of said pair of clips comprising an engaging portion of said top clip comprising
      a first vertical arm of said engaging portion of said top clip coupled to and extending downwardly from a first end of a horizontal arm of said engaging portion of said top clip;
      a second vertical arm of said engaging portion of said top clip coupled to and extending downwardly from a second end of said horizontal arm of said engaging portion of said top clip wherein said engaging portion of said top clip has a U-shaped cross section taken along a longitudinal axis extending between a first lateral edge and a second lateral edge of said top clip;
   said engaging portion of said top clip insertably receiving a top portion of the filter wherein each of said first and second vertical arms of said engaging portion of said top clip abuts an associated one of a back side and a front side of the top portion of the filter and said horizontal arm of said engaging portion of said top clip abuts a top side of the top portion of the filter wherein the filter is retained in said engaging portion of said top clip;
   a retaining portion of said top clip comprising a horizontal arm of said retaining portion of said top clip coupled to and extending laterally away from a bottom end of said first vertical arm of said engaging portion of said top clip;
   a vertical arm of said retaining portion of said top clip coupled to and extending upwardly from a second end of said horizontal arm of said retaining portion of said top clip wherein said retaining portion of said top clip has a J-shaped cross section taken along a longitudinal axis extending through a first lateral edge and a second lateral edge of said top clip;
   an external arm coupled to and extending laterally away from a bottom end of said second vertical arm of said engaging portion of said top clip;
   said retaining portion of said top clip insertably receiving a top edge of a filter track in the air handler wherein said top clip is retained in the air handler;
   a bottom one of said pair of clips comprising
      an engaging portion of said bottom clip comprising a first vertical arm of said engaging portion of said bottom clip coupled to and extending upwardly from a first end of a horizontal arm of said engaging portion of said bottom clip;
      said engaging portion of said bottom clip comprising a second vertical arm of said engaging portion of said bottom clip coupled to and extending upwardly from a second end of said horizontal arm of said engaging portion of said bottom clip wherein said engaging portion of said bottom clip has a U-shaped cross section taken along a longitudinal axis extending between a first lateral edge and a second lateral edge of said bottom clip;
      said engaging portion of said bottom clip insertably receiving a bottom portion of the filer wherein each of said first and second vertical arms of said engaging portion of said bottom clip abuts an associated one of a back side and a front side of the bottom portion of the filter and said horizontal arm of said engaging portion of said bottom clip abuts a bottom side of the bottom portion of the filter wherein the filter is retained in said engaging portion of said bottom clip;
      a retaining portion of said bottom clip comprising a horizontal arm of said retaining portion of said bottom clip coupled to and extending laterally away from a top end of a first vertical arm of said engaging portion of said bottom clip;

a vertical arm of said retaining portion of said bottom clip coupled to and extending downwardly from a second end of a horizontal arm of said retaining portion of said bottom clip wherein said retaining portion of said bottom clip has a J-shaped cross section taken along a longitudinal axis extending through a first lateral edge and a second lateral edge of said bottom clip;

an external arm coupled to and extending away from a top end of said second vertical arm of said engaging portion of said bottom clip; and said retaining portion of said bottom clip insertably receiving a bottom edge of the filter track in the air handler wherein said bottom clip is retained in the air handler; and respective pluralities of teeth coupled to each of said retaining portion of said top clip and said retaining portion of said bottom clip.

\* \* \* \* \*